US009400594B1

(12) United States Patent
Zarcheany

(10) Patent No.: US 9,400,594 B1
(45) Date of Patent: Jul. 26, 2016

(54) ORGANIZATIONAL SYSTEM AND METHOD FOR COLLECTING, STRUCTURING, LINKING, AND PRESENTING DISPARATE INFORMATION

(71) Applicant: Shmuel Zarcheany, Irvine, CA (US)

(72) Inventor: Shmuel Zarcheany, Irvine, CA (US)

(*) Notice: Subject to any disclaimer, the term of this patent is extended or adjusted under 35 U.S.C. 154(b) by 206 days.

(21) Appl. No.: 14/225,399

(22) Filed: Mar. 25, 2014

Related U.S. Application Data

(60) Provisional application No. 61/804,887, filed on Mar. 25, 2013.

(51) Int. Cl.
*G06F 3/048* (2013.01)
*G06F 3/0484* (2013.01)

(52) U.S. Cl.
CPC .................................. *G06F 3/0484* (2013.01)

(58) Field of Classification Search
None
See application file for complete search history.

(56) References Cited

U.S. PATENT DOCUMENTS

| 7,146,574 | B2* | 12/2006 | Goldthwaite | G06F 17/30873 707/E17.111 |
| 7,664,821 | B1* | 2/2010 | Ancin | H04L 12/5885 709/206 |
| 8,356,248 | B1* | 1/2013 | Killalea | G06Q 30/0601 707/751 |
| 8,612,517 | B1* | 12/2013 | Yadid | H04N 21/25891 709/201 |
| 2008/0109718 | A1* | 5/2008 | Narayanaswami | G06Q 10/109 715/262 |
| 2008/0244453 | A1* | 10/2008 | Cafer | G06F 3/04817 715/835 |
| 2008/0294663 | A1* | 11/2008 | Heinley | G06F 3/0481 |
| 2010/0185984 | A1* | 7/2010 | Wright | G06T 11/206 715/833 |
| 2012/0166971 | A1* | 6/2012 | Sachson | G06F 17/30551 715/753 |
| 2013/0055106 | A1* | 2/2013 | Tarneberg | G06Q 10/107 715/753 |

* cited by examiner

*Primary Examiner* — Stephen Alvesteffer
(74) *Attorney, Agent, or Firm* — Kafantaris Law Offices; Theo Kafantaris

(57) ABSTRACT

The present invention will provide a system that organizes content based on time, location, involved entities, and events, and relates this information to the user in an easy to read and intuitive display. This is accomplished by utilizing a data acquisition module, a link generation module, a conflicts module, a graphical data intersection module, a data filtering module, a mapping module, a presentation module, and a data integration module. These modules allow for a user to input events information into an easy to manipulate multiple interactive timeline display.

20 Claims, 14 Drawing Sheets

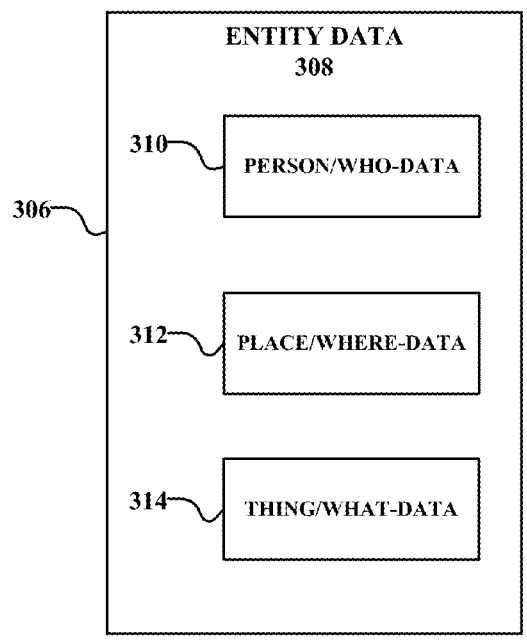
FIG. 3A
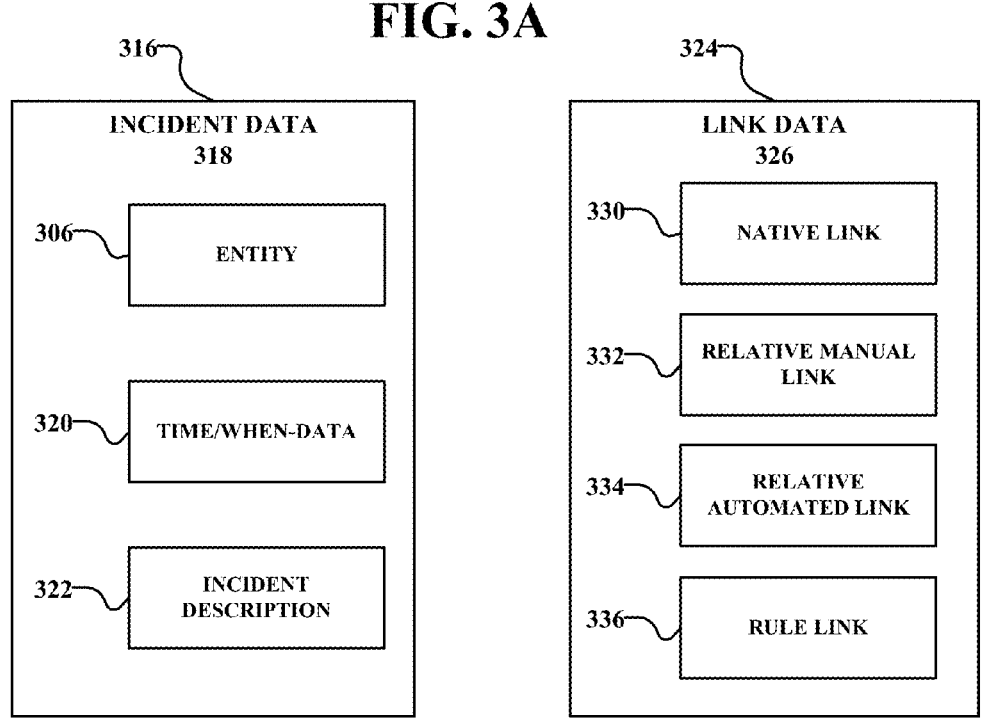
FIG. 3B          FIG. 3C

ORGANIZATIONAL SYSTEM AND METHOD FOR COLLECTING, STRUCTURING, LINKING, AND PRESENTING DISPARATE INFORMATION

CROSS-REFERENCE TO RELATED APPLICATIONS

This application claims the benefit of U.S. Provisional Patent Application No. 61/804,887, filed on Mar. 25, 2013, and incorporated herein by reference.

STATEMENT REGARDING FEDERALLY SPONSORED RESEARCH AND DEVELOPMENT

Not Applicable.

FIELD OF THE INVENTION

This invention relates generally to structuring disparate information, and more particularly, to an organizational system and method for collecting, storing, organizing, relating, analyzing, and presenting events based on time, location, involved entities, and events.

DISCUSSION OF RELATED ART

A timeline is a method of displaying events in a list, where order is determined chronologically. Timelines are commonly found in educational settings with the purpose of helping students understand the events or relationships between events surrounding a particular topic. Timelines are also used by lawyers and law enforcement agencies to establish known information involving a particular case or entity, and by private companies for project management or analyses. Timelines can quickly become cluttered when the quantity of events, entities, and locations being observed becomes large, and they are therefore limited in their ability to display the big picture while still simplifying the relationships between the information's data elements.

Data is the abstract concept of information given to or by a user. The data being examined by a user or researcher is generally unstructured, or has a dissimilar structure, and is therefore difficult to display and relate in an intuitive manner. Once the data is processed, analyzed, and perceived by a user, it is referred to as relevant information. When displaying information, the provider typically uses other visual representations tools which accentuate the underlying pattern, complexity, or variance in the original data set.

A search engine is an application designed to provide content based information through the internet or other applications. The search engine provides an interface where the user inputs data usually in the form of keywords or sentences. The search engine then outputs the results as list of results often referred to as "search engine results pages," also known as SERP's. The SERP's are ranked based on their relevance to the search terms used. Current leading search engines include Google, Yahoo, and Bing.

While there are very powerful tools for obtaining content based information, these tools lack the cohesion that would optimize the ability of a user to effectively relate, analyze, and display this information. The user can acquire information but must bear the burden of searching for the correct data and organizing the data into meaningful a visual representations for effective analysis and presentation purposes. Hence, this process often limits the user from optimizing his/her time while synthesizing large amounts of information or data.

Therefore, a need exists for a system that organizes any content based on time, location, involved entities, and events, and relates this information to the user in an easy to read display. The present invention satisfies these needs.

SUMMARY OF THE INVENTION

The present invention is a system that organizes content based on time, location, involved entities, and events, and relates this information to the user in an easy to read and intuitive display. This is accomplished by utilizing a data acquisition module, a link generation module, a conflicts module, a graphical data intersection module, a data filtering module, a mapping module, a presentation module, and a data integration module. These modules allow for a user to input events information into an easy to manipulate multiple interactive timeline display.

The present invention is useful in today's digital era, as we are all faced with, and exposed to, an enormous amount of information that in most cases is formatted, stored, and presented in various dissimilar ways. The information at its nature may or may not be an important subject to the viewer, but once accessed, the viewer has to process it visually and mentally in order to quickly consume and comprehend its content. While the information can be free to access, such as blogs and news on the internet, unshared private information is generally protected behind security enforced data centers that require membership eligibility to access it, challenging and mandating the user to locate and access different data sources sites such as health, insurance, bank and telephone records separately.

Whatever the connotation and significance level that the information presents, most often it describes events that are subject of interest to the user and relates to diverse aspects. For example, an avid news reader can subscribe to many blogs, social media and news information sources to follow on subjects of interests such as politics, entertainment, economic or sport. At the same time, the same user can login to other information data sites such as bank accounts, wages, mortgage records, health records, insurance records and emails to follow on the status of private matter information. In most cases, information is presented to the user in three main and common formats: a) plain formatted essays, decorated with images, videos and graphic gimmicks such as news and social media data; b) information organized in logical matrix structure of listed records and tables, such as bank transactions or telephone activities records; c) a mix of both—essays and matrixes. Regardless of the presentation method, all information can generally be described as events, with each event having a person, place, and/or thing, a time, and a location. Henceforth, any unit of information can be formed and described as an event or incident, and this forms the basis of the present invention.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DESCRIPTION OF THE DRAWINGS

FIG. 3A is a diagram schematically illustrating entity data of the present invention;

FIG. 3B is a diagram schematically illustrating incident data of the present invention;

FIG. 3C is a diagram schematically illustrating link data of the present invention;

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
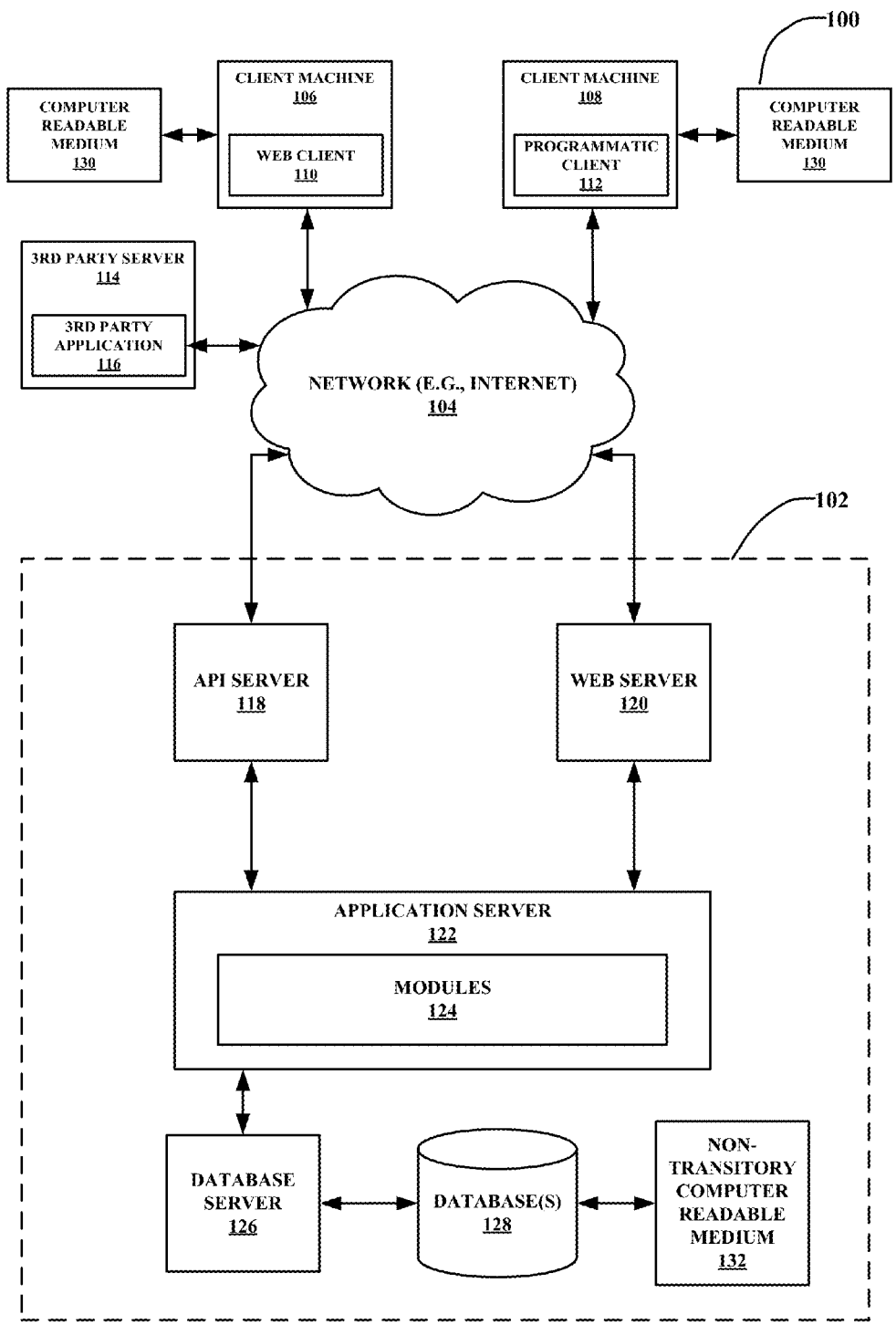
FIG. 1 depicts a block diagram of a computer system suitable for implementing aspects of the present invention.
Figure 2:
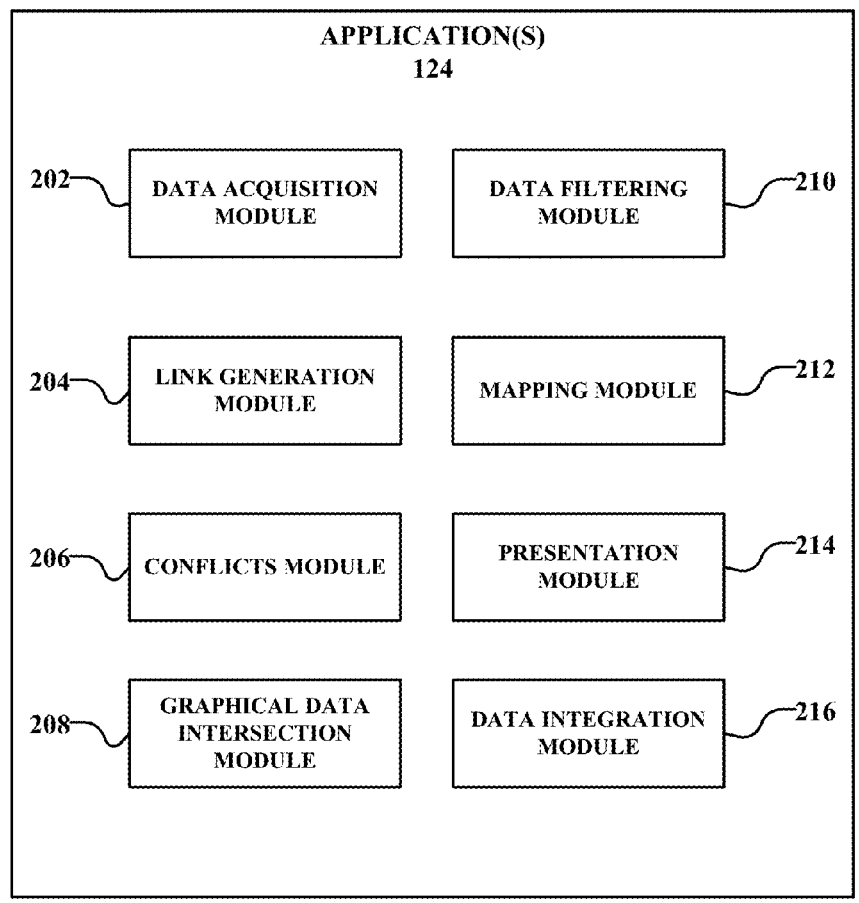
FIG. 2 is a diagram schematically illustrating the modules of the present invention.
Figure 4:
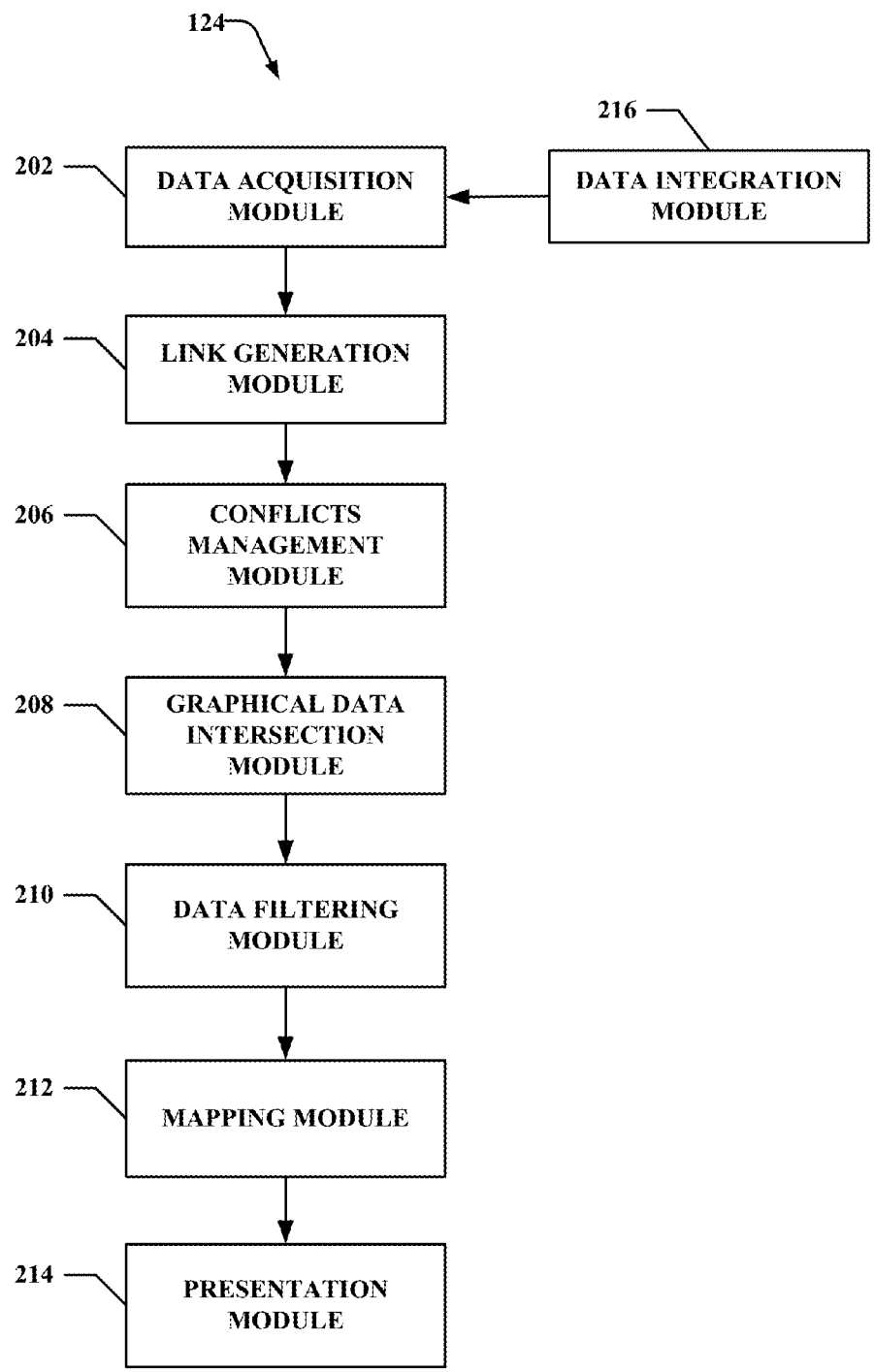
FIG. 4 is a flowchart illustrating the process flow of the present invention.
Figure 5:
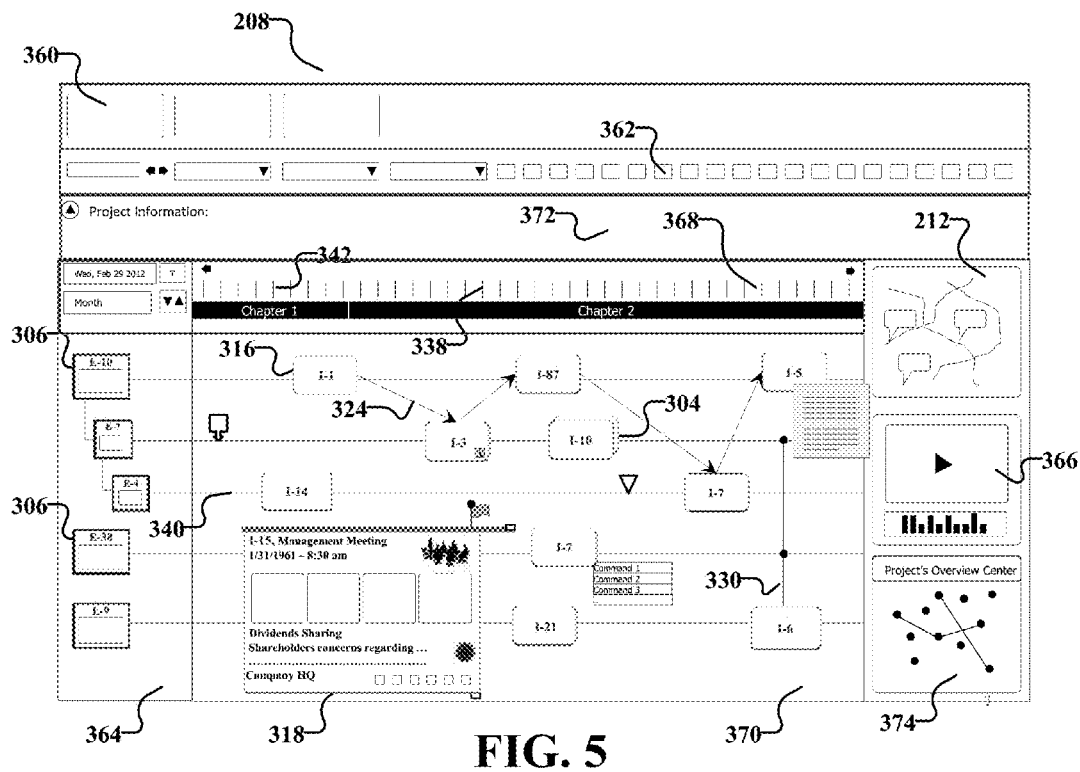
FIG. 5 is a diagram illustrating the main view of the present invention.
Figure 6:
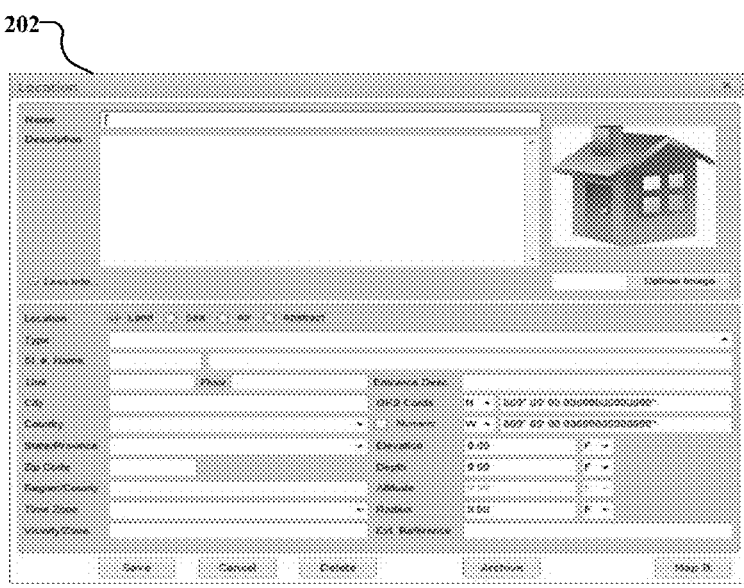
FIG. 6 is a diagram illustrating the data acquisition module of the present invention.

FIG. 1 depicts a block diagram of a computer system 100 suitable for implementing aspects of the present invention. As shown in FIG. 1, computer system 100 includes the present invention 102, which interconnects major subsystems such as an API server 118, web server 120, application server 122, and database server 126 having a storage means 132. The application server 122 consists of several modules 124, and a database 128 exists on the database server 126. The present invention 102 connects to client machines 106 and 108, as well as 3rd party servers 114, through a network 104. Web clients 110 and programmatic clients 112 exist on the client machines 106 and 108, respectively, and 3rd party applications 116 that exist on the third party server 114.

Specifically, the present invention 102 comprises a server 126, a database 128 residing on the server 126, and several wired and mobile clients 110, 112 capable of communicating with the server 126. The primary purpose of the present invention 102 is to allow the user to organize disparate data elements and relate these elements in an easy to understand and intuitive display. Disparate data elements comprise: entities (people, places, things, organizations, groups, objects, vehicles, abstract items, etc.), units of measure (time, weight, distance, temperature, etc.), places or locations, relevant text (actions, thoughts, notes, comments, links, and bookmarks), and other internal objects (incidents, events, links, rules, etc.). The present invention utilizes eight modules to perform this task: a data acquisition module 202, a link generation module 204, a conflicts module 206, a graphical data intersection module 208, a data filtering module 210, a mapping module 212, a presentation module 214, and a data integration module 216. In conjunction, these modules allow a user to assimilate and visualize a large set of similar or dissimilar data in a plurality of ways, as well as analyze, validate for conformity or discrepancy, and account for data elements within such a set.

The data acquisition module 202 is configured to receive and store project data 302. Project data 302 comprises events 304, entities 306, incidents 316, and links 324, and is stored on a non-transitory storage medium 130. An event 304 comprises one or more related incidents 316. An incident 316 comprises incident data 318 further comprising a plurality of entities 306, a time 320, and an incident description 322, but must include at least one entity 306 and a time (or duration) 320. An entity 306 comprises entity data 308 further comprising a person 310, place 312, or thing 314. Project data 302 may be entered manually or automatically.

Incidents 316 and entities 306 are stored as independent data units, and as such, an incident 316 can be part of multiple different events 304, and an entity 306 can be part of multiple different incidents 316. An incident 316 or entity 306 may further comprise an archive 346, which acts as a special information vault to any data element in the project for storing additional related data files. Archive data files 346 further comprise audio files, video files, images, documents (text and scanned documents), contact information, surveillance video, address history, biographical information (such as personal, educational, marital and employment information), known names, alerts, locations, identification information, and binary files. The archive 346 is full-text indexed and used as an input for search, analysis and conflict management, and functions as a storage data center for incidents 316 as well as other data elements. Furthermore, entities 306 are hierarchically structured into parent entities and child entities, wherein parent entities may comprise one or a plurality of child entities.

Person, or who-data, 310 comprises who and/or what was involved in an incident 316. In other words, "who are the actors or participants who initiated or were involved in the incident?" These can be passive or active entities 306, such as witnesses or spectators. These entities 306 are not limited to people, but may comprise five varieties: people, organizations or groups which form a relevant unity to the incident, objects whose function serves a rational purpose to the incident occurrence, vehicles which participate in the incident, and abstract entities which impact the incident. Abstract entities comprise documents, credit cards, ideas, account numbers, email addresses, or other data.

Place, or where-data 312, comprises where an incident 316 took place, including land, sea, air, or other abstract locations. More specifically, where-data is defined by the location of the given incident, which can have a plurality of descriptors, comprising: a physical street address, a longitude and latitude point, an altitude, an elevation, a depth, an azimuth, an angle, or a general place description (library, cockpit, laboratory, etc.) for which an exact physical location is unimportant.

Thing, or what-data 314, comprises the physical action which describes an incident 316, what has happened in an incident, a description of the event or incident, what actions took place, or what thoughts/intentions were involved. What data 314 can be expressed as a text file, an audio file, a video file, an image, or any similar data point that accurately describes the occurrence of the related incident 316. Thing data 314 may be stored as an entity 304, as an incident description 322, as an archive data file 346, or any plurality of the three.

Time, or when-data 320, comprises when an incident 316 or event 304 occurred, and may include duration. More specifically, when-data 320 is defined by the date, time, and time zone that the given incident occurred, either by a single time and date, or a window of time and dates representing the starting and ending time of an incident. In an alternative embodiment, time (or duration) 320 can be replaced with any unit of measure (time, weight, distance, temperature, etc.). As such, when-data 320 is measured according to the terms of the unit of measurement in the scale bar section of the graphical data intersection module.

Figure 7:
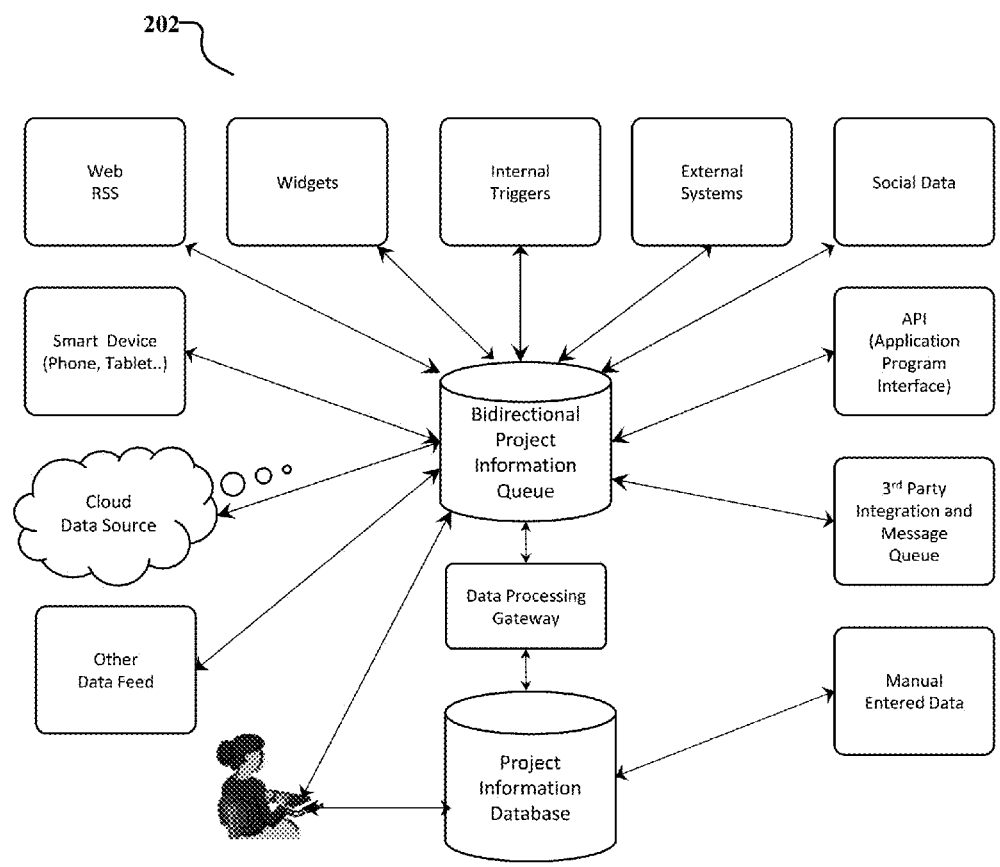
FIG. 7 is a diagram illustrating the data sources of the present invention.
Figure 8:
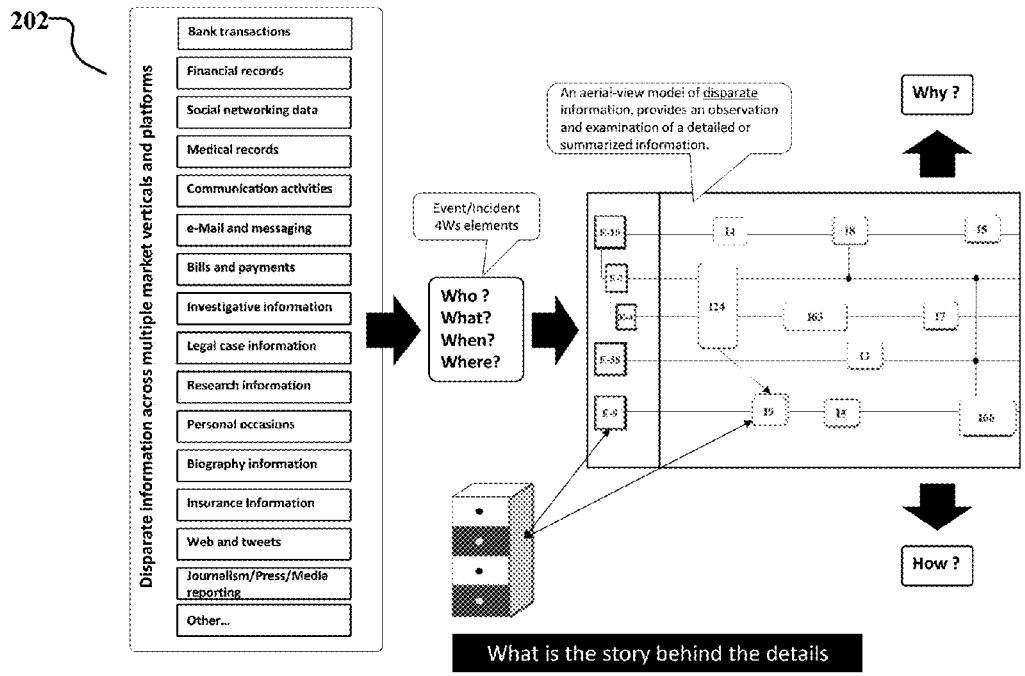
FIG. 8 is a diagram illustrating entity and entity data of the present invention.
Figure 9:
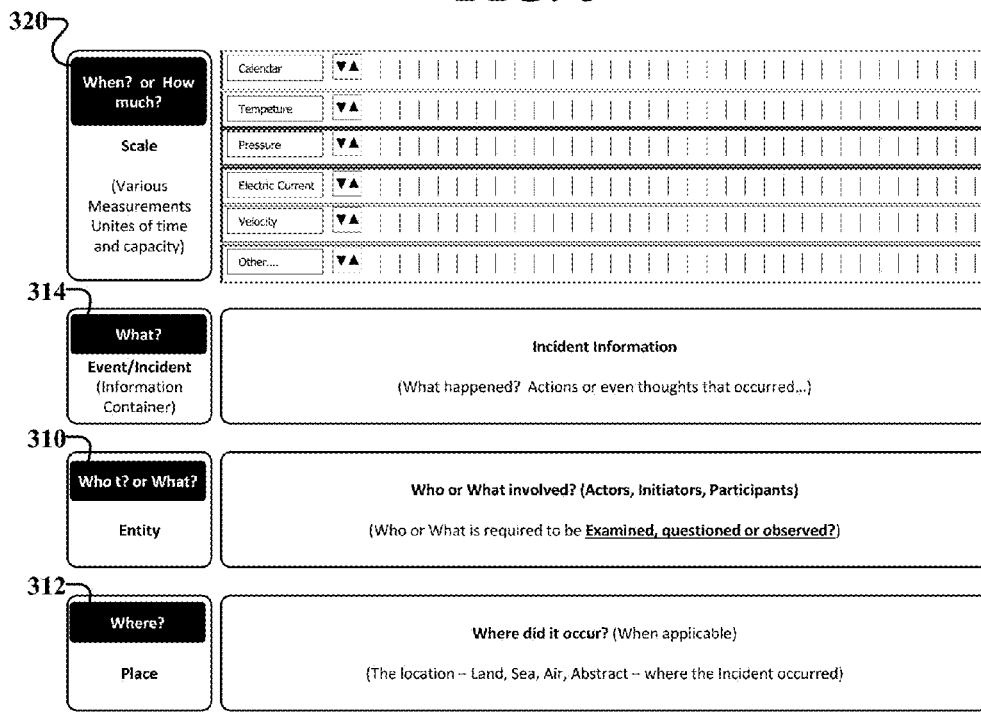
FIG. 9 is a diagram illustrating entity and entity data of the present invention.
Figure 10:
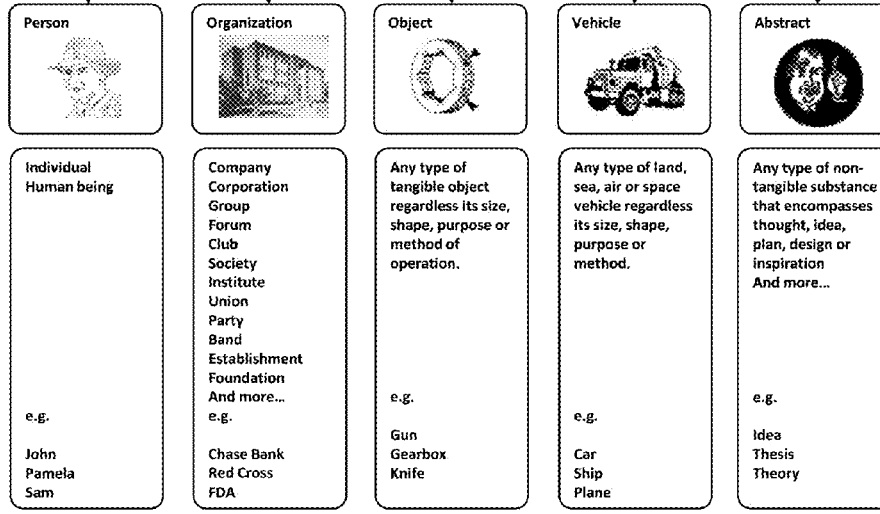
FIG. 10 is a diagram illustrating entity and entity data of the present invention.
Figure 11:
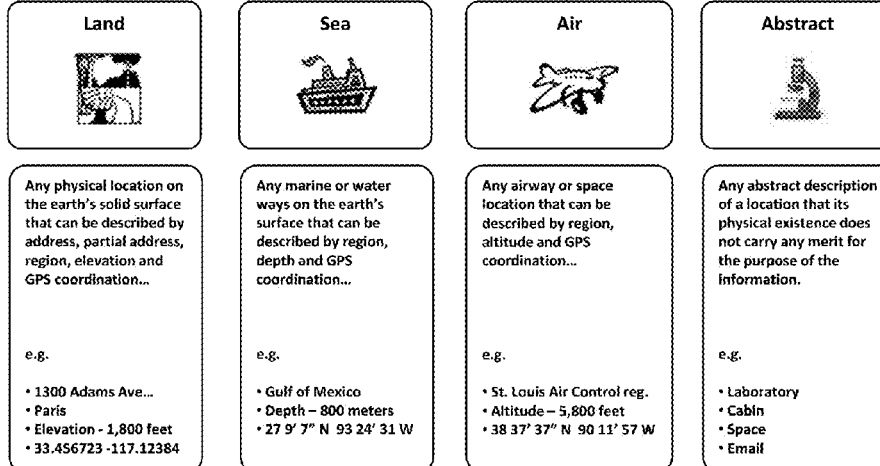
FIG. 11 is a diagram illustrating entity and entity data of the present invention.
Figure 12:
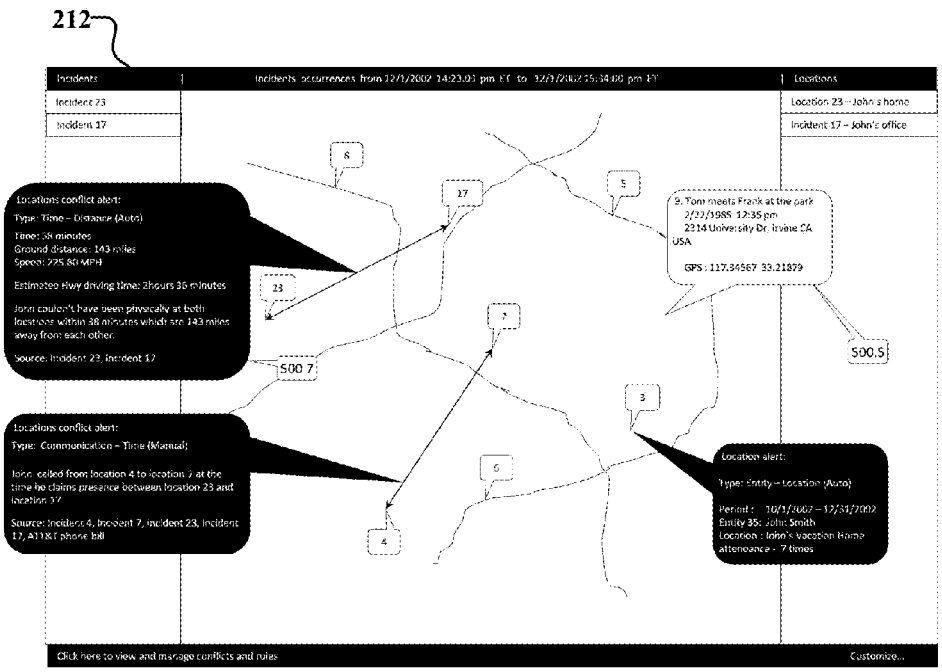
FIG. 12 is a diagram illustrating the mapping module of the present invention.
Figure 13:
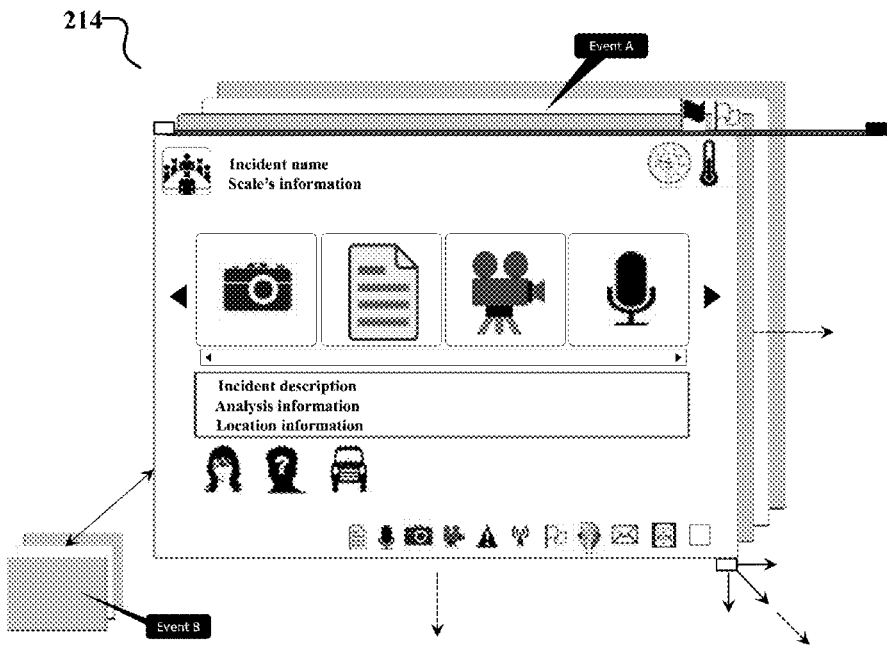
FIG. 13 is a diagram illustrating the presentation module of the present invention.
Figure 14:
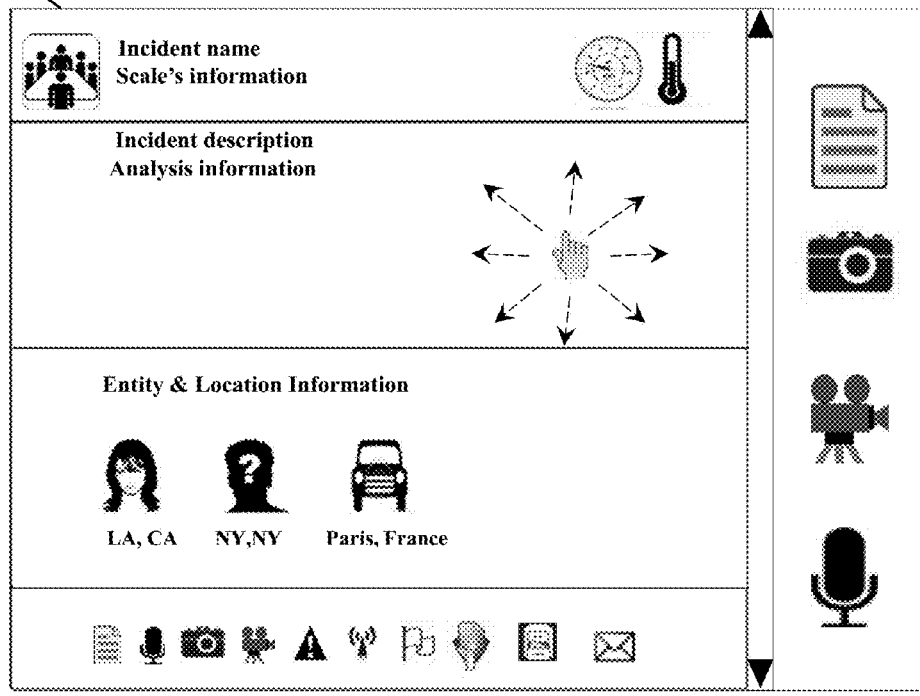
FIG. 14 is a diagram illustrating the presentation module of the present invention.
Figure 15:
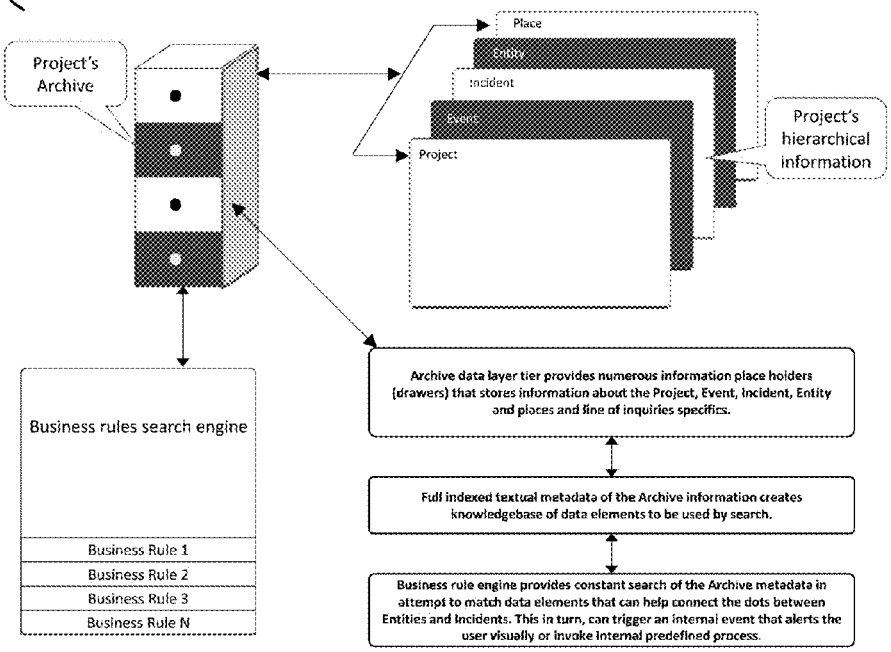
FIG. 15 is a diagram illustrating the archive and data structure of the present invention.
Figure 16:
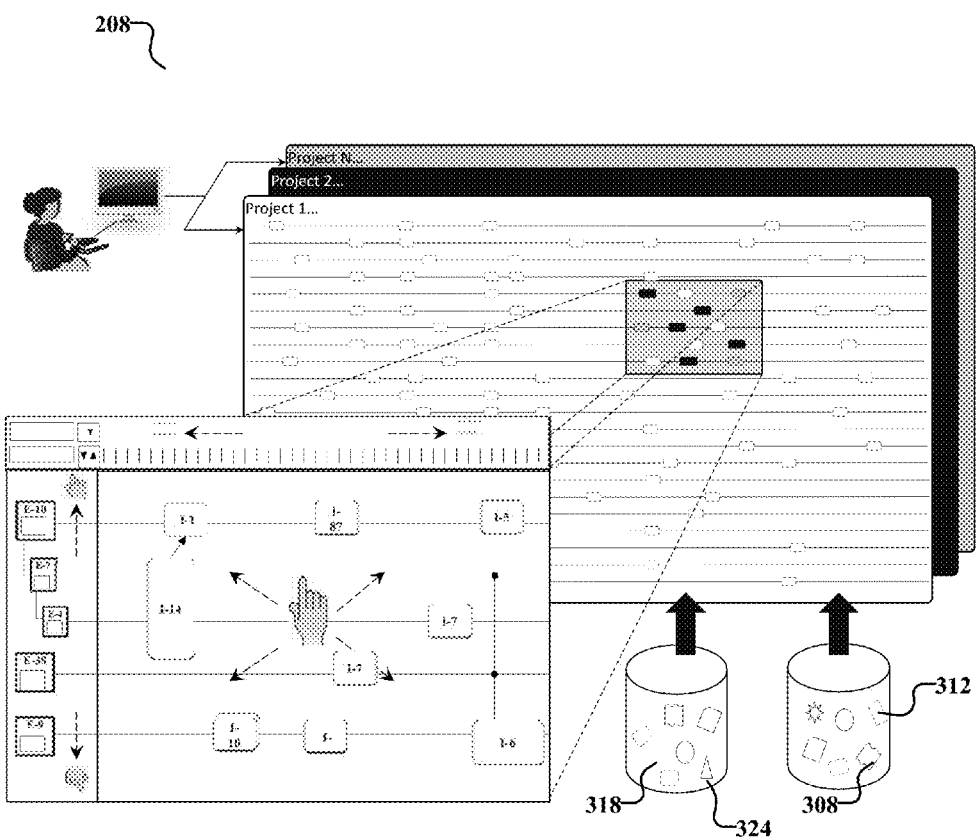
FIG. 16 is a diagram illustrating the graphical data intersection module of the present invention.
Figure 17:
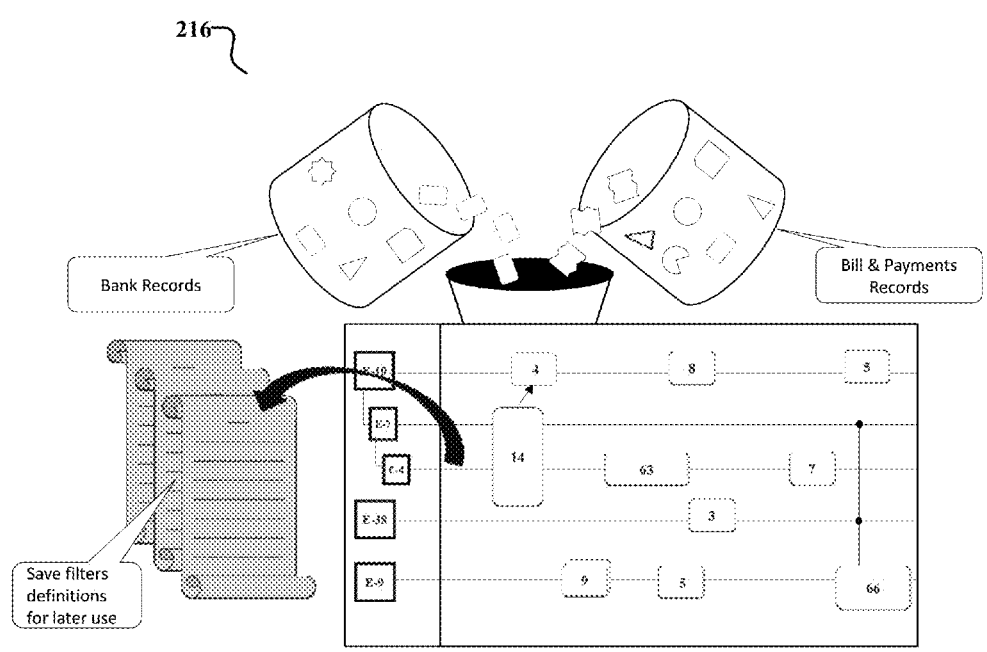
FIG. 17 is a diagram illustrating the data integration module of the present invention.
Figure 18:
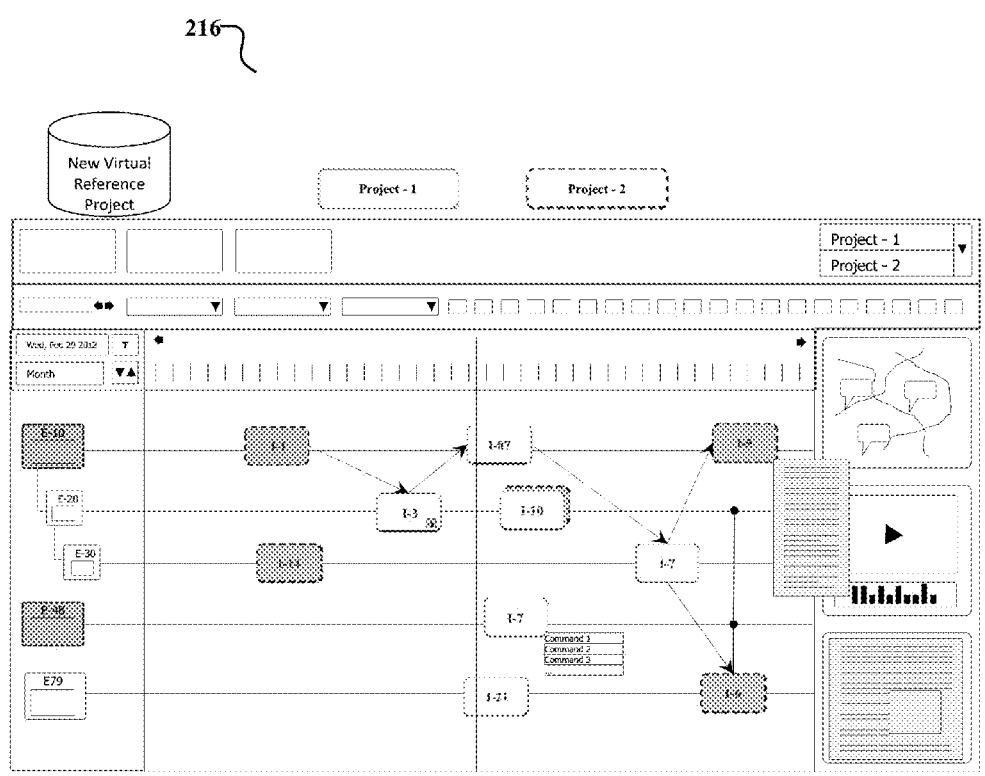
FIG. 18 is a diagram illustrating the data integration module of the present invention.
Figure 19:
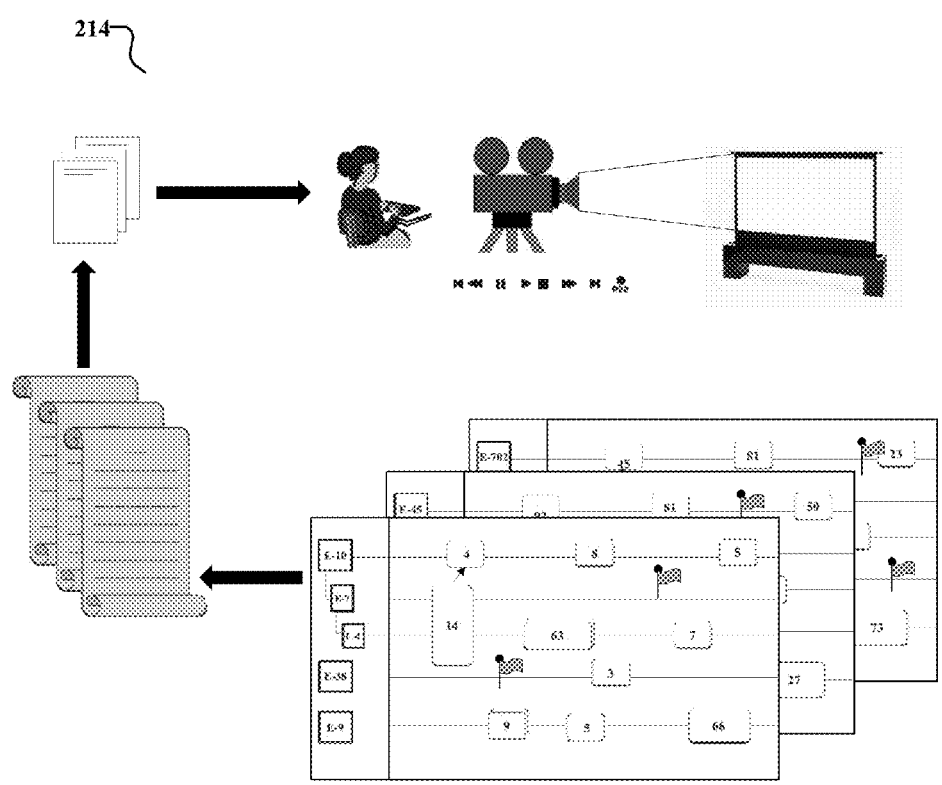
FIG. 19 is a diagram illustrating the module flow of the present invention.

As mentioned above, the data acquisition module 202 may receive input manually or automatically. Manual input requires the user to actively enter project data 302 into the relevant data types using the graphical data intersection module 208 or through an appropriate application interface. Automatic input receives electronically transmitted source data from a server, gateway, or any other source, parses said data for people 310, places 312, things 314, times 320, and automatically populates events 304, incidents 316, entities 306, and links 324. Source data (FIGS. 7, 8) comprises web blogs, RSS feeds, application widgets, databases and information triggers, social media data, mobile device data, internal/external application program interfaces, messaging systems, cloud infrastructures, and other relevant sources of data. In an alternative embodiment, automatically populated data is stored in a queue and processed after an administrator or user approves the parsed data. Here, all electronic data messages are placed into a queue, where a trigger will invoke the data acquisition module to process the information. When unattended, the information is introduced and flagged as new to draw the user's attention. When attended, the user can hold the information in the queue, reject the information and notify the sender of the rejection, or accept the information into the project.

The link generation module 204 is configured to generate links 324, wherein links 324 further comprises an association between incidents 316 having common entity 306 or incident data 318. The link generation module 204 provides the ability to associate events 304, incidents 316, entities 306, and other relevant data to each other and indicate them as a part of a broader information gathering for analysis, briefing, and presentation purposes. Linking between incidents 316 is commonly described as a "Line of Inquiry", or simply, "LOI." The number of LOI definitions in each project 302 is unlimited. Incidents 316 can be associated to a single or multiple LOIs. By associating incidents 316 to LOIs, a theme or trend of occurrences is revealed and displayed.

Links 324 further comprise native links 330, relative manual links 332, and relative automated links 334, and can be created automatically or manually. Automated links include native links 330 and relative automated links 334. Native links 330 are an automatically generated link 324 between incidents 316 having common entities 306. Relative automated links 334 are automatically created when the link generation module 204 evaluates and compares incidents 316 for common associations, such as places 312, times 320, entities 306, or keywords and their synonymous, and generates a link strength. A relative automated link 332 is automatically generated between incidents 316 if the link strength is above a link strength threshold value. Relative manual links 332 are user-created links 324 between related incidents 316. Relative manual links 332 are important because, once an LOI link is established, the user can enhance it by adding relative manual links 332 to other incidents using user discretion.

When a link 324 is formed between two or more incidents 316, a directed line is drawn connecting the incidents 316. For automated links, the lines are generated automatically, while manual links are created by drawing a line between two or more incidents 316 and providing link data 326. Links 324 can have different graphical characteristics such as line color, thickness, or line style to differentiate them from each other when displayed. Multiple links 324 can be displayed all at once, or hidden, as determined by the user, and link strength may further dictate link type and whether a link 324 will be displayed or hidden. Links 324 can also be used as a filter to exclude non-relevant information from being displayed and as desired by the user.

The link generation module 204 further comprises rules 336. Rules 336 are persistent search queries associated with incidents 316, entities 306, or timeframes 320, wherein each rule 336 further comprises a keyword, timeframe, and action. In other words, rules 336 are a type of relative automated link 334 wherein the link strength is always above the link strength threshold value, and as such, a relative automated link 334 is always created when the rule 336 is satisfied. For example, a rule 336 may be created to generate a link 324 between any incidents 316 having the keywords "desert eagle" between 2004 and 2008. Rules 326 will have a separate line type and color to differentiate them from other link types.

The conflicts management module 206 comprises comparing and analyzing incident data 318 for all incidents 316 and determining whether they are consistent with one another. When a conflict occurs, the related incidents 316 are flagged and brought to the user attention. Specifically, the involved incidents 316 are flagged and displayed on the mapping module 212 as well as the graphic data integration module 208, where the user can approve of the conflict, reject the conflicting data, or modify the conflicting data. The user can provide general conflicts rules definitions or rely on existing types, which are constantly calculated as new data is entered.

A time-distance conflict comprises a conflict in which the possibility that a single entity 306 involved in two incidents 316 at different locations 312 and different times 320 can be verified or invalidated based on physical limitations such as travel speed. Here, a first incident having a first location is compared with a subsequent incident having a second location. A velocity is generated by calculating the distance between the incidents and the time difference, and dividing the distance by the time. If the velocity between the first incident and the second incident is above a threshold value, the first and second incidents are flagged. For example, the project data 302 indicates that John was involved with incidents in Seattle and Miami that were 120 minutes apart. The distance between the two is approximately 3000 miles, and as such, John's velocity is 1500 miles/hour. This condition triggers the time-distance conflict because it is not possible to travel at those speeds.

A second type of conflict comprises a statistical conflict, wherein statistical information of an entity 306, location 312, and time 320 is examined, and if a predefined threshold is reached, a statistical computation flag is executed to notify the user. A third type of conflict comprises a location trace, where the location of incident A is unknown, but the metadata of incident A matches 80% of the metadata of five other known incidents. As such, there is a likelihood that incident A occurred at a location similar to the other five related incidents, which triggers the location trace flag. A last type of conflict comprises an information conformity conflict, where unique data types are compared. For example, if two firearms are found to have the same serial number, this condition triggers the information conformity conflict, and the entity 306 or incident 316 is flagged and the user is notified of such conflict.

Once a conflict is discovered, a visual alert is presented to the user. The alert form comprises of a popup, text box, selection box, differently colored flag, or any other combination. Alerts may include sounds and/or vibration for further alerting the user of an existing conflict. Alerts may occur during analysis or in real time as information is dynamically received. Furthermore, users may create an alert within an incident to notify other users of important or critical information.

The graphical data intersection module 208 is configured to display events 304, incidents 316, entities 306, and links 324 on a scalable timeline 338 or valueline, wherein entities 306 are displayed on a first axis 340, time 320 (or measurable value) is displayed on a second axis 342, incidents 316 are displayed as intersections between related first and second axes, and links 324 are displayed as lines between incidents 316. The graphical data intersection module 208 further comprises eight main sections: a main menu 360, a toolbar 362, an adjustable entity pan 364, an enhanced information center 366, a scale bar 368, an events pan 370, and project information section 372, and a project overview center 374.

The main menu section 360 comprises a thin strip which spans across the entire width along the top of the graphical interface display screen. This section contains the user access points for major tools and functions concerning the system management and project currently displayed. The toolbar section 362 also comprises a thin strip which spans across the entire width of the display, and is located directly beneath the main menu section 360. The toolbar section 362 contains commands and tools to maintain and manipulate the information particular to the project 302 currently being displayed. The project information section 372 comprises a thin expandable strip which spans across the entire width of the display, and is located directly beneath the toolbar section 362. The project information section 372 contains general and statistics information about the project 302.

The adjustable entity pan section 364 comprises a rectangular panel which is justified along the left edge of the display screen and is seated directly below the toolbar section 362. The entity pan 364 displays any number of people, places, objects, or similar entities 306 which are currently being examined by the user. These entities 306 are participants involved in one or more incidents 316 being tracked by the present invention 102, and can be used to filter results displayed in other sections of the graphical interface. Additionally, the user may focus on an entity 306, which will organize and display all incidents 316 pertaining to the focused entity 306 within the adjustable entity pan 364. The adjustable entity pan 364 allows the user to organize its content, whether it is entities 306, incidents 316, or places 312, in a desired order and in hierarchical parent-child tree view relation for better visualization and readability. The reorder and tree view structure is achieved through a drag-and-drop operation, keyboard commands, or menu commands. The adjustable entity pan 364 also permits the user to scroll up and down through its content using drag or inertial dragging.

The enhanced information center section 366 comprises a rectangular panel which is justified along the right edge of the display screen and is seated directly below the scale bar section 368. The enhanced information center 366 contains specific details pertaining to all or individually selected incidents 316 or entities 306, including, but not limited to: dynamic maps, images, audio and video files, and documents. If multiple details files pertaining to incident 316, entity 306, or place 312 are available, they can all be displayed at once, or individual files can be selected, played, and/or expanded by the user. The enhanced information center 366 can be displayed or hidden as desired to allow more display space for the events pan section 370.

The scale bar section 368 comprises a thin rectangular panel which spans the distance between the top right edge of the adjustable entity pan 364 and the top left edge of the enhanced information center 366. The scale bar 368 is configurable to any unit of measure upon which the stored data is related to, including but not limited to: date and time, temperature, pressure, current, power, speed, velocity, and other relevant values. The scale bar 368 allows the user the ability to pan left or right through the varying units of measure, as well as have the scope of the unit of measure widened or lessened as desired. Special scale controls allow the user to change the scale to a desired scope, which in effect widen or narrows the amount of the displaced information in the event pan section 366. For example, in case of time related data, the user can select a six month range of information scope and certain date and time to center the display on. The display will then change to reflect this scope (e.g. January 15th to June 14th) time range and display the relevant information that corresponded to it. The user can then pan left or right to view other time related information corresponding to the current scale's time scope.

The graphical data intersection module 208 will further provide a wide range of preset scales or ranges from seconds to years. However, the user can create his or her own user-defined scale definitions which are natively incorporated into the scale bar section. By using the mouse wheel-in and mouse wheel-out, scales are automatically changed, creating zoom-in and zoom-out display effects, which causes the geometric shapes on the project's display to increase and decrease respectfully. The scale controls also provide the option to dynamically change the current view by increasing or decreasing the viewed time scope. For example, if the current time scope is six months—(i.e. 1/1/2012 to 6/30/2012, scale range is six months)—and the user wishes to add one month only to the time scope, then he or she can use the "add time" control which will result by the system recalculating the events' pan section 370 display to show information between 12/16/2011 to 7/15/2012, now displaying seven month time scope. If the user uses the "reduce time" control to narrow the time scope by one month, the system will recalculate the events' pan section display to show information between 1/16/2012 to 5/15/2012, displaying a five month time scope. The add-reduce time scope can be performed on any scale type, e.g. seconds, minutes, hours, days, weeks, months and years.

The events pan section 370 is a rectangular panel which spans the distance between the remaining right edge of the adjustable entity pan 364 and the remaining left edge of the enhanced information center 366, when displayed, or the right edge of the screen. Events 306, incidents 316, and analysis information is displayed in the events pan 370 and represented by geometric shapes. The information displayed within the events pan 370 can be divided into chapters, and further divided into episodes within a chapter. Particular events 306 or incidents 316 can be selected and expanded within the events pan 370, as well as assigned a shape, color, and other graphical symbols to be determined by the user.

The event pan section 370 acts as an events information mapping. The user can drag it in all direction—left, right, up, down and diagonally. By rolling the mouse wheel in or out (known as mouse-in or mouse-out computer events), the scales level changes and the displayed information scope is widen or narrowed while recalculating the geometrical shapes position and displaying the corresponding events 306, incidents 316, and links 324 accordingly. In addition, the user can double-click on any area of the events pan section 370 to center it on the screen and perform zooming-in operation.

Events 304 and incidents 316 are displayed as geometric shapes within the events pan section of the graphical display. Incidents 316 comprise an information container that assimilates all the incident's factual, analysis and enhanced information. An incidents 316 horizontal position on the event pan section is determined by its measurements units (i.e. date and time, temperature, power, etc.) and its vertical position is determined by its association with the entity 306 in the entity pan. The incident's 316 height and width geometric dimensions are determined by the scale level definitions. The broader the scale scope (in terms of displayed measurements units), the smaller the incident's 316 height and width dimensions. The narrower the scale scope, the larger the incident's 316 height and width dimensions.

Different icons, symbols, indicators and other geometric shapes and gages can be attached to each incident 316 by the user to quickly identify the incident data 318 and status, its association to line of inquiry, participation in filters, level of importance, archived information, and much more. Each incident's 316 look and feel design comprises of two forms, horizontal and vertical. The user can manually resize an individual incident 316, and the event pan display automatically adjusts surrounding incidents 316 to best fit the display space. By using the commands on the toolbar, the user can manipulate the event pan section display to effectively enhance the user visualization experience. Such commands allow the user to increase, decrease or reset all incident's 316 geometric sizes at once, increase or decrease spaces between incidents 316 on the screen, highlight group of connected events, drag event 304 to another location on the screen, and much more.

The project overview center 374 comprises a birds eye view of the entire project 302, specifically, events 304, incidents 306, entities 306, and links 324 outside the scope of the current view. The project overview center 374 will always scale to display all data for the entire project 302. As such, the project overview center 374 is critical when quickly jumping to a second timespan when viewing data in a first timespan, or vice versa. Furthermore, the project overview center 374 provides a quick, visual representation of the project 302 as a whole, where incident 316 density can be increasingly important.

The data filtering module 210 comprises a filtering mechanism that permits the user to perform a deep-level search on any keywords that are associated with any project's data 302. Here, events 304, incidents 316, entities 306, or links 324 can be displayed or hidden based on manual grouping or keyword search criteria. Once a filter is activated and results are found, the graphical data intersection module 208 calculates and redisplays the entity and event pans sections with the newly selected incidents 316. The incidents 316 which were excluded by the search terms are temporarily hidden from the user, allowing the user to focus on a smaller set of incidents 316. Filter keywords sets can be named and saved, and the user can reactivated the search by recalling the filter.

The mapping module 212 is configured to graphically display the location 312 of incidents 316 and entities 306 for visual analysis. Here, incident 316 and entity 306 locations 312 are displayed on a map by online interfacing with external mapping utilities and displaying their location markers and related analysis information such as conflicts, alerts, statistics, and other graphical elements. The mapping module 312 can display incident 316 locations only, entity 306 locations only, or any combination of the two where any association is found. A time 320 or time range can be selected to scope out which incidents' 316 locations 312 should participate in the mapping view. A list of participating incidents 316 and alerts is optionally presented in the left side pan and the user can select or deselect which information should be displayed at any given time and as desired. In addition, a list of participating locations 312 in the map is optionally presented in the right side pan and the user can select or deselect which location(s) 312 should be displayed on the map and as desired. A comprehensive information tooltip can be optionally displayed to enhance the information clarity. Based on predefined possible conflicts, the mapping module 212 will further display links 324 and conflicts between events 304 or incidents 316 and allow the user to dynamically manage these conflicts definitions. Distance, traveling speed, frequency of occurrence, travel route, location prediction, and other statistical computations can all be displayed in the mapping module 212.

The presentation module 214 is configured to chronologically playback each incident 316, wherein said playback further comprises focusing on an incident 316, playing archive media files, displaying the location 312 in the mapping module 212, and reading aloud incident data 318. The presentation module 214 comprises four main functions: a) creation of a presentation script; b) presentation tickets generation; c) playing said presentation script (presentation playback); and d) presentation recording. The presentation module will be available on cue, as projects in their creation process or completed state may need to be shared and presented to the stakeholders and/or supervisors in different settings.

While each project is being populated with data, the present invention 102 tracks the project's data 302 and creates a baseline presentation script which contains step-by-step presentation playback instructions. The baseline presentation script can be used to create new scripts while omitting and reordering playback instructions. In addition, the user can add presentation audio notes, timing instructions, and textual footnotes or subtitles to enhance the presentation viewing experience. For each presentation script, the user can generate presentation tickets that can be disseminated to the targeted audiences by any electronic means. These presentation tickets can be assigned to individuals or groups and timely restricted by expiration date. Using the presentation ticket, the user can activate the presentation while using VCR-like controls to control its sequencing and progress. While viewing the project's information, and if permitted by the project's owner or the presentation script author, the viewer can record the presentation information and create a script-based project on a local or network storage.

The data integration module 216 is configured to combine project data 302 comprising events 304, incidents 316, entities 306, and links 324 from a plurality of projects for visual display through the graphical data intersection module 208, wherein said project data 302 is distinguished through transparency, color difference, line type, line formatting, and incident shape. The data integration module 216 allows the user to view several projects' information in one session for comparison and analysis. Here, multiple projects are displayed in the events and entities pan, which can be compared, assessed, analyzed, edited, linked, and otherwise manipulated as if they were in the same project. Conflicts and alerts are also calculated and displayed once multiple projects are combined. The user can quickly return to the individual projects by using the toolbar to switch to single project mode. Joint information sharing can be limited using permissions, where the project's owner has absolute control when and what information can be exposed, viewed, and/or edited by other users. Dynamic projects can be created and saved when multiple projects are combined, so long as permission has been granted.

When in use, the present invention 102 will receive events 304, incidents 316, and entities 306, generate native 330 and automated relative links 332, and display said events 304, incidents 316, entities 306, and links 324 on a scalable timeline 338 (or valueline), wherein entities 306 are displayed on a first axis 340, time 320 (or measurable value) is displayed on a second axis 342, incidents 316 are displayed as intersections between related first 340 and second axes 342, and links 324 are displayed as lines between incidents 316. Events 304, incidents 316, entities 306, and links 324 can be hidden or displayed based on manual grouping or keyword search criteria, and all data is stored as a project 302 on a non-transitory computer readable medium 130. The present invention 102 permits users to collect, organize, and relate disparate information in one common interface.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An organizational system for structuring disparate information, the system comprising:
   a data acquisition module configured to receive entities and incidents, wherein entities further comprise entity data containing a person, place, or thing, and wherein incidents further comprise incident data containing at least one entity, a time, and an incident description;
   a link generation module configured to generate links, wherein links further comprise an association between incidents having different entities and different times;
   a graphical data intersection module configured to display entities, incidents, and links on a scalable timeline, wherein entities are displayed on a first axis, time is displayed on a second axis, incidents are displayed as intersections between related first and second axes, and links are displayed as lines between incidents;
   a data filtering module adapted to hide or display entities, incidents, or links based on manual grouping or keyword search criteria; and
   a non-transitory storage medium configured to store said entity data, incident data, and links as a project;
   wherein said organizational system for structuring disparate information permits users to collect, organize, and relate disparate information in one common interface.

2. The system of claim 1, further comprising:
   a mapping module configured to graphically display the location of entities and incidents;
   a data integration module configured to combine project data comprising entity data, incident data, and links from a plurality of projects for visual display through the graphical data intersection module, wherein said project data is distinguished through transparency, color difference, line type, line formatting, and incident shape; and
   a conflicts management module configured to analyze incident data for conflicts and flag conflicting incidents, wherein conflicts further comprise time-distance conflicts and statistical conflicts.

3. The system of claim 2, wherein said conflicts management module further comprises searching each entity for a first incident having a first location and a subsequent incident having a second location, calculating a velocity between said first and second incidents, and flagging said first and second incidents if said velocity is over a velocity threshold value.

4. The system of claim 1, further comprising a presentation module configured to chronologically playback each incident, wherein said playback further comprises focusing an incident, playing media files, displaying the location, and reading aloud incident data.

5. The system of claim 1, wherein said data acquisition module further comprises receiving source data, parsing said source data for people, places, things, times, and incidents, and automatically populating said entities, incidents, and links with said parsed data.

6. The system of claim 1, wherein said entities further comprises parent entities and child entities, wherein said parent entities and child entities are hierarchically structured and displayed.

7. The system of claim 1, wherein said links further comprise native links between incidents having a common entities, and relative manual links created due to user input between related incidents.

8. The system of claim 7, wherein said links further comprise relative automated links generated when link strength between incidents is above a link strength threshold value, wherein said link strength is calculated by evaluating and comparing all incident data for common associations, wherein said link strength threshold value dictates a line type.

9. The system of claim 8, wherein said link generation module further comprises rules, wherein rules are persistent search queries associated with incidents, entities, or timeframes, wherein each rule further comprises a keyword, timeframe, and action.

10. The system of claim 1, wherein the data acquisition module further comprises an archive associated with an incident, entity, timeframe, or link, wherein said archive further comprises receiving and storing audio files, video files, images, documents, text, locations, and binary files.

11. A processor-implemented method for organizing event-driven information, the method comprising:
  receiving entities and incidents, wherein entities further comprise entity data containing a person, place, or thing, and wherein incidents further comprise incident data containing at least one entity and a time;
  generating links, wherein links further comprise an association between incidents having different entities and different times;
  displaying entities, incidents, and links on a scalable timeline, wherein entities are displayed on a first axis, time is displayed on a second axis, incidents are displayed as intersections between related first and second axes, and links are displayed as lines between incidents;
  hiding or displaying entities, incidents, or links based on manual grouping or keyword search criteria; and
  storing said entity data, incident data, and link data as a project on a non-transitory computer readable medium;
  wherein said event-driven information organizational system permits users to collect, organize, and relate disparate information in one common interface.

12. The method of claim 11, further comprising:
  graphically display the location of entities and incidents on a map;
  combining entity data, incident data, and link data from a plurality of projects; and
  analyzing incident data for conflicts and flagging conflicting incidents, wherein conflicts further comprise time discrepancies, distance discrepancies, and statistical discrepancies.

13. The method of claim 11, further comprising chronological playback of each incident, wherein said playback further comprises focusing an incident, playing media files, displaying the location, and reading aloud incident data.

14. The method of claim 11, further comprising receiving source data, parsing said source data for people, places, things, times, and events, and automatically populating said entities, incidents, and links with said parsed data.

15. The method of claim 11, further comprising organizing entity data as parent entities and child entities, wherein said parent entities and child entities are hierarchically structured and displayed.

16. A non-transitory computer-readable storage medium storing a set of instructions that, when executed by a processor, cause the processor to perform operations, comprising:
  receiving entities and incidents, wherein entities further comprise entity data containing a person, place, or thing, and wherein incidents further comprise incident data containing at least one entity and a measurable value;
  generating links, wherein links further comprise an association between incidents having different entities and different times;
  displaying entities, incidents, and links on a scalable valueline, wherein entities are displayed on a first axis, said measurable value is displayed on a second axis, incidents are displayed as intersections between related first and second axes, and links are displayed as lines between incidents;
  hiding or displaying entities, incidents, or links based on manual grouping or keyword search criteria; and
  storing said entity data, incident data, and link data as a project;
  wherein said event-driven information organizational system permits users to collect, organize, and relate disparate information in one common interface.

17. The non-transitory computer-readable storage medium of claim 16, further comprising:
  graphically display the location of entities and incidents on a map;
  combining entity data, incident data, and link data from a plurality of projects; and
  analyzing incident data for conflicts and flagging conflicting incidents, wherein conflicts further comprise measurable value discrepancies, distance discrepancies, and statistical discrepancies.

18. The non-transitory computer-readable storage medium of claim 16, further comprising chronological playback of each incident, wherein said playback further comprises focusing an incident, playing media files, displaying the location, and reading aloud incident data.

19. The non-transitory computer-readable storage medium of claim 16, further comprising receiving source data, parsing said source data for people, places, things, times, measurable values, and events, and automatically populating said entities, incidents, and links with said parsed data.

20. The non-transitory computer-readable storage medium of claim 16, further comprising organizing entity data as parent entities and child entities, wherein said parent entities and child entities are hierarchically structured and displayed.

* * * * *